United States Patent Office 3,515,766
Patented June 2, 1970

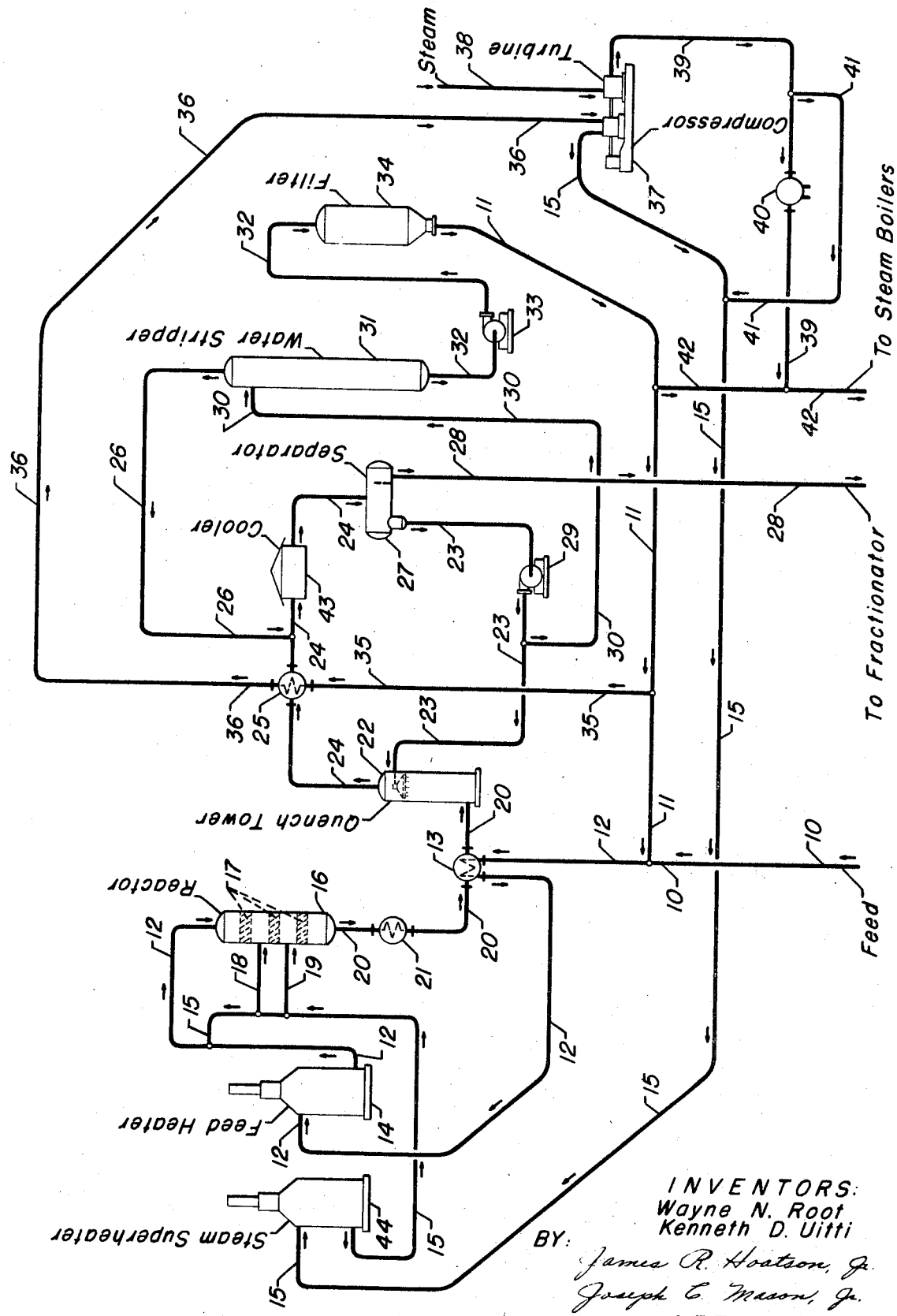

3,515,766
CATALYTIC CONVERSION PROCESS
Wayne N. Root, Des Plaines, and Kenneth D. Uitti, Bensenville, Ill., assignors to Universal Oil Products Company, Des Plaines, Ill., a corporation of Delaware
Filed May 21, 1968, Ser. No. 730,782
Int. Cl. C07c 5/18, 15/10
U.S. Cl. 260—669
8 Claims

ABSTRACT OF THE DISCLOSURE

Process for converting hydrocarbons, such as ethylbenzene to styrene, wherein the steam condensate separated from the reaction zone effluent is purified by stripping and filtration.

BACKGROUND OF THE INVENTION

This invention relates to the endothermic catalytic conversion of hydrocarbons. It particularly relates to an improved process for the dehydrogenation of ethylbenzene to styrene. More specifically, this invention relates to a more economic catalytic process for obtaining styrene through the steam dehydrogenation of ethylbenzene.

Those skilled in the art recognize the importance of being able to economically produce styrene since this chemical, otherwise called phenylethylene is extensively employed throughout commerce as a raw material for the production of resins, plastics, and elastomers. Specifically, styrene is copolymerized with butadiene to produce high molecular weight synthetic rubber. Although styrene may be recovered in limited quantities from various coal tars, it is preferred to synthesize large quantities by the dehydrogenation of ethylbenzene. The raw material, ethylbenzene, can either be separated from petroleum fractions by super-distillation or can be synthetically prepared, such as through the alkylation of benzene with ethylene.

The prior art methods for producing styrene are generally carried out by passing a mixture of ethylbenzene and steam over a fixed bed of dehydrogenation catalyst. In order to heat the reactants to the reaction temperature, it is also general practice to admix the ethylbenzene which is at a temperature significantly below reaction temperature with steam which has been superheated to a temperature above the reaction temperature so that the admixture is at reaction temperature as it passes over the dehydrogenation catalyst. Since the basic chemical reaction involved, namely the dehydrogenation of ethylbenzene to styrene, is endothermic there is a significant decrease in the reaction zone temperature as the reaction proceeds. It is not unusual in these prior art processes to witness a drop of perhaps 50° F. to 150° F. within the reaction zone or across a particular catalyst bed. Naturally, as the temperature decreases, the rapidity and efficiency of the reaction also decreases so that the overall efficiency of the process declines to a point where it would be economically unattractive unless processing schemes were found to overcome this disadvantage.

Again, the prior art has attempted to solve this problem by drastically increasing the temperature of the superheated steam so that the difference between the inlet temperature of the reactants and the outlet temperaure of the reaction products averaged, generally, the required reaction temperature. However, it was noted that at the instant the superheated steam is admixed with ethylbenzene, the ethylbenzene undergoes thermal decomposition or cracking through the pyrolytic reaction. In many instances, such pyrolysis is effected to such a degree that the process becomes uneconomical due to the loss of ethylbenzene to carbon monoxide, carbon dioxide, polymeric materials, tars, etc. Another disadvantage involved in this dehydrogenation process is the utility cost in raising the temperature of large quantities of steam to a level far above that required for effecting the dehydrogenation of ethylbenzene and then subsequently wasting this large amount of low grade heat by condensing the steam to water and removing the condensate from the process area. Thus, the failure of the prior art to carefully utilize all of the heat available in the low grade steam remaining in the effluent from the conversion zone has made it extremely difficult, even with modern innovations, to produce styrene in an economical manner.

SUMMARY OF THE INVENTION

Accordingly, it is an object of this invention to effect a more economic method for dehydrogenating ethylbenzene to produce styrene in high concentration.

It is also an object of this invention to provide a process for the endothermic catalytic conversion of hydrocarbons in the presence of steam whereby the low grade heat available in the effluent steam is productively utilized.

It is another object of this invention to provide a process for the dehydrogenation of ethylbenzene to styrene characterized by a high conversion per pass of ethylbenzene to styrene.

In accordance with the present invention, there is provided a process for the endothermic catalytic conversion of hydrocarbons in a conversion zone which comprises passing hydrocarbons to be converted into said zone under conversion conditions including the presence of hereinafter specified steam; removing from said zone a total effluent stream comprising converted hydrocarbons and steam; separating said effluent into a hydrocarbon stream and an aqueous stream into a treating zone under conditions sufficient to remove therefrom a portion of said contaminants; introducing the treated aqueous stream into a filtration zone under conditions sufficient to substantially remove the remaining contaminants from the stream thereby producing a purified condensate; producing steam from said purified condensate; and, utilizing at least part of said produced steam in said conversion zone.

Another embodiment of the present invention includes the process hereinabove wherein the conversion reaction is the dehydrogenation of ethylbenzene to styrene.

Another embodiment of this invention includes the process hereinabove wherein said filtration zone comprises a fixed bed of adsorbent selective for said contaminant.

The advantages of the inventive process will be more clearly understood with reference to the attached drawing which is a schematic representation of the process flow illustrating a preferred embodiment of the invention. Although the present invention encompasses a catalytically-conducted process, it is understood that the same is not to be unduly limited to the utilization of a particular catalyst composite, containing a particular concentration of components. The catalyst employed for the dehydrogenation reaction is preferably an alkali-promoted iron catalyst of the type commonly known as "Shell 105" or "Shell 205." Such a catalyst may consist essentially of 85.0% by weight of ferrous oxide, 2.0% by weight of chromia, 12.0% by weight of potassium hydroxide, and 1.0% by weight of sodium hydroxide, or 90.0% by weight of iron oxide, 4.0% by weight of chromia and 6.0% by weight of potassium carbonate. While these known commercial dehydrogenation catalysts are preferred, other known dehydrogenation catalysts may be employed, and include ferrous oxide-potasssium oxide, other metal oxides and/or sulfides, including those of calcium, lithium, strontium, magnesium, beryllium, zirconium, tungsten, molybdenum, titanium, hafnium, vanadium, aluminum, chromium, copper, and mixtures of two or more including chromia-alumina, alumina-titania, alumina-vanadia, etc. Similarly, the various methods of preparing the aforesaid dehydrogenation catalysts are well known within the prior art, and it is understood that the present process is not dependent upon the utilization of a catalytic composite manufacture in any particular manner.

DETAILED DESCRIPTION OF THE DRAWING

With reference now to the attached drawing, ethylbenzene enters the process through line 10 being also admixed with recycle ethylbenzene from means not shown. Typically, the ethylbenzene stream is at a temperature of about 100° F. In order to facilitate the vaporization of the ethylbenzene and to provide sufficient heat for reaction, steam in the form of hereinafter specified purified condensate is added to the ethylbenzene feed stream from line 11 and the admixture of ethylbenzene and purified steam condensate is passed via line 12 into feed-effluent heat exchanger 13 and continues via line 12 into heater 14 wherein the temperature is raised to a level of about 1000° F., well above the temperature at which ethylbenzene is dehydrogenated. As defined in the prior art, the dehydrogenation of ethylbenzene is generally effected at temperatures within the range from 932° F. to about 1292° F. The heated feed mixture continues through line 12 wherein it is admixed with a quantity of superheated steam from a source hereinafter described via line 15 wherein the feed-steam temperature is raised again to a level of above 1100° F. at which point it enters reactor 16.

Reaction zone 16 comprises, for example, three (3) fixed beds 17 of catalyst for effecting the dehydrogenation reaction. The catalyst employed is, preferably, an alkali-promoted iron catalyst of the type previously described.

The admixture of steam and ethylbenzene is passed into the first catalyst bed 17, typically, at a temperature of about 1125° F. sufficient to convert ethylbenzene to styrene. The conditions in the first catalyst bed include not only the catalyst and temperatures described above, but also include the weight hourly space velocity. The space velocity as used herein is defined as pounds of ethylbenzene charged per hour per pound of catalyst disposed in reactor 16. Typically, the weight hourly space velocity is within the range of about 0.1 to 2.0 and, preferably, within the range of about 0.2 to about 1.5. The space velocity at any given time is correlated with a selected inlet temperature to result in a reactor product effluent averaging typically about 1065° F.

The amount of catalyst contained in each catalyst bed may be varied considerably. Typically, the bed depth may range from 2 feet to 6 feet, the lower range being preferred to minimize pressure drop.

The reactor pressure may also be varied over a considerable range as long as sufficient diluting steam is present to hold the charge pressure of the hydrocarbons at a low level, e.g. below atmospheric pressure. Sufficient pressure must be maintained at the reactor inlet to overcome the pressure drop through the multiple beds of catalyst contained in the reactor vessels or in separate vessels if each such bed is contained in a separate reactor. Either multiple beds contained in a single reactor or single beds in multiple reactors or mixtures of these arrangements may be used in the satisfactory practice of this invention.

As the reactants in line 12 contact the catalyst contained in the first catalyst bed 17 in reactor 16 there is a temperature decrease observed across the catalyst bed due to the endothermic nature of the reaction. Without additional heat having been added, the temperature in the void space between the beds of the effluent leaving the first catalyst bed would be in the order of 50° F. to 150° F. or more, less than the inlet temperature selected for the material in line 12. Therefore, a portion of the previously mentioned superheated steam in line 15 is added to the effluent via line 18.

The admixture of effluent and added steam from line 18 creates a second feed mixture which is preferably at a temperature substantially the same as the reactor temperature specified hereinabove. This heated second feed mixture is then contacted with the preferred dehydrogenation catalyst in a second bed 17 contained in reactor 16 under conditions sufficient to convert additional ethylbenzene present therein to styrene.

The effluent from the second catalyst bed 17 is similarly of a reduced temperature. Therefore, another portion of the previously described superheated steam is passed into the void space between the second and third beds via line 19 in order to reheat or restore the reactants in the void space to the desired conversion temperature for the last succeeding catalyst bed 17. Similarly, additional ethylbenzene is dehydrogenated in the third catalyst bed 17 in the presence of the superheated steam which has been added via lines 15, 18, and 19.

As the total effluent leaves reactor 16 via line 20 there is an overall conversion of ethylbenzene to styrene of at least 50% and, typically, may be 65%. This total effluent in line 20 contains styrene, unconverted ethylbenzene, gaseous products, including hydrocarbons and hydrogen which have been produced during the dehydrogenation reaction, and steam. This total effluent stream is passed through heat exchangers 21 and 13 for the substantial cooling thereof say, 320° F. to 450° F., typically 400° F., prior to passage directly into quench tower 22.

In quench tower 22 this total effluent stream is abruptly quenched in temperature by the direct contact therein of steam condensate which enters tower 22 via line 23. The amount of condensate required for quench may vary from 0.1 to 2.5 pounds of condensate per pound of total effluent, typically, 0.2 pound per pound. The quenched effluent now at a temperature, typically, of about 220° F. is withdrawn via line 24 and passed into steam generator 25 for the production of steam from hereinafter specified purified condensate. The total effluent stream is withdrawn from steam generator 25, typically, at a temperature of about 210° F.–217° F. via line 24 and passed through cooler 43 into separator 27.

At separator 27, the liquid hydrocarbons, e.g. styrene, ethylbenzene, and by-product liquids, such as benzene and toluene, are removed from the process via line 28 for separation and recovery of the styrene utilizing a plurality of fractionation means, typically, having associated therewith reboiler means for supplying heat for distillation. If desired, the separated ethylbenzene may be recycled to the process with the feed in line 10 as mentioned hereinabove. Also, as more fully discussed hereinafter, a particular embodiment of this invention involves the utilization of steam produced in a novel manner for the reboiler heat in such fractionation means. Normally gaseous products, including hydrogen and light hydrocarbons, are removed from separator 27 by means not shown.

The steam which has been condensed is also separated in separator 27 and removed via line 23 and passed through pump 29 at least in part to quench tower 22 as previously mentioned. It was found that the purity of the water in line 23 is sufficiently pure for quench purposes, although it is substantially contaminated with hydrocarbons, such as styrene and ethylbenzene. Another portion of the contaminated water in line 23 is passed via line 30 through heating means (not shown) into steam stripper 31. Sufficient steam from a source not shown is introduced into stripper 31 in an amount sufficient to strip out of the water phase the contaminating hydrocarbons which are then, preferably, returned via line 26 to separator 27 in admixture with the effluent which is passing through line 24 and cooler 43. However, water stripper 31 is not efficient enough to completely purify the water for steam generation purposes. Accordingly, the treated water which is removed from stripper 31 via line 32 is steam contaminated with, say, from 0.01 mol percent to 0.08 mol percent hydrocarbons in solution, as well as, say, up to 1% (mol) in suspension. This relatively small amount of contaminants was found to be sufficient to clog up conventional boilers which are used for steam generation purposes and also sufficient to clog up heat exchangers which are used in a variety of ways throughout the processing scheme. Accordingly, the present invention now takes the treated water through pump 33 into filter means 34 which, preferably, contains a solid adsorbent, such as molecular sieves, selective for the contaminants.

The treated water is passed through filter 34 and is removed via line 11 in substantially purified state. This purified steam condensate is now of sufficient purity for utilization anywhere in the processing scheme without additional treatment. Accordingly, as previously mentioned, a portion of the purified steam condensate is passed via line 11 into admixture with the feed in line 10. Another portion of the purified steam condensate is passed via line 35 into steam generator 25 previously mentioned. Still, a further portion of the purified steam condensate is passed out of the processing system via line 42 into, for example, steam boilers for the generation therein of high pressure steam (steam boilers not shown).

Returning now to steam generator 25, the resulting steam which, typically, may be at subatmospheric pressure, e.g. from 10 to 12 p.s.i.a., is passed via line 36 into compressor 37 wherein its pressure is raised to, say, 30 to 50 p.s.i.a. Compressor 37 is also driven by steam turbine means utilizing high pressure steam which enters the turbine via line 38. It is within the concept of this invention that a portion of the steam condensate which was passed out of the system via line 42 be used to generate high pressure steam which is returned to the system via line 38. The turbine exhaust steam is removed via line 39 at a pressure, preferably, which is substantially the same pressure as the compressed steam in line 15. Therefore, a portion of the exhaust steam in line 39 may be admixed with the compressed steam in line 15, passed into steam superheater 44 and into the reactor 16 in the manner previously discussed for the introduction of superheated steam into the reaction zone. In one embodiment of this invention the exhaust steam in line 39 is passed into the reboilers 40 associated with the plurality of fractionators utilized to recover styrene from the material in line 28, as previously described. Steam condensate obtained from fractionator reboilers 40 continues via line 39 into admixture with the purified condensate being removed from the system via line 42 and utilized as described, preferably, for the generation of high pressure steam.

In essence, therefore, it can be seen that the present invention provides a means for complete utilization of the steam and steam condensate throughout the processing scheme in a manner which effectuates economy of operation and avoids pollution problems which are normally inherent in the prior art processes which have to dump contaminated water into the sewer system.

Usually, the amount of steam used in admixture with the feed for the dehydrogenation of ethylbenzene to styrene will vary from about 1.0 pound per pound to about 20 pounds of steam per pound of ethylbenzene. Typically, the amount of steam and ethylbenzene are in proportion of about 2.8 pounds of steam per pound of ethylbenzene. Therefore, those skilled in the art will recognize the importance of the present invention in conserving and reusing this tremendous quantity of steam and steam condensate.

Although the present invention has been described with reference to the appended drawing and to the reaction for the dehydrogenating of ethylbenzene to styrene, it is to be noted that the process of the present invention is equally applicable broadly to the endothermic catalytic conversion of hydrocarbons which require steam for some purpose. It is particularly applicable, however, to the dehydrogenation of alkylated aromatic hydrocarbons, such as ethylbenzene, isopropylbenzene, diethylbenzene, ethylnaphthalene, ethylchlorobenzene, and the like.

Furthermore, while the invention thus far has been described utilizing a reactor having three (3) catalyst beds disposed therein, it will be realized that the present invention can be satisfactorily preformed with as few as one (1) catalyst bed and in some instances as many as five (5) or more catalyst beds.

The filtration means described hereinabove can be of any type known to those skilled in the art. However, it is distinctly preferred that the filter be of the sort containing a solid adsorbent selective for the contaminants present in the water from the treating unit. These contaminants not only comprise the hydrocarbons mentioned, but also comprise dirt, tars, polymers, and the like, which are formed in a catalytic conversion process of the sort described. Generally, the adsorbent will be selected from the group consisting of activated charcoal, molecular sieves, alumina, spent cracking catalysts, activated clay, sand, and diatomaceous earth. It is distinctly preferred that the adsorbent comprise molecular sieves having a pole diameter which will selectively adsorb the contaminants permitting the passage through the filtering means of the water so that a purified steam condensate is obtained as a result of the practice of this invention.

The operating conditions for filtration zone 34, preferally, include elevated temperature such as 200° F.–210° F. and at substantially atmospheric pressure. Satisfactory liquid hourly space velocity for solid adsorbents includes 1.0 to 10.0 typically, about 5.0 (volume of contaminated water per volume of solid adsorbent per hour).

PREFERRED EMBODIMENT

Therefore, in accordance with the teachings presented herein, particularly with reference to the appended drawing, a preferred embodiment of this invention includes a process for producing styrene in high concentration via the catalytic dehydrogenation of ethylbenzene which comprises the steps of: (a) admixing ethylbenzene and steam condensate and passing said admixture into a conversion zone maintained under conditions sufficient to convert ethylbenzene to styrene; (b) removing from said zone a total effluent stream comprising styrene, ethylbenzene, gaseous hydrocarbons, and steam; (c) quenching said effluent with an aqueous stream; (d) passing the quenched effluent into a separation zone under conditions sufficient to produce a hydrocarbon fraction and an aqueous fraction contaminated with hydrocarbons; (e) returning a portion of said aqueous fraction from step (d) to step (e) as at least part of said quench; (f) introducing the remainder of said aqueous fraction of step (d) into a stripping zone under conditions sufficient to produce an overhead fraction comprising mainly relatively light hydrocarbons and a bottoms fraction comprising mainly dirty water and relatively heavy hydrocarbonaceous products; (g) passing said bottoms fraction into a filtration zone under conditions including the presence of a solid adsorbent sufficient to remove dirt and said relatively heavy products from the water thereby producing purified steam condensate; and, (h) returning at least a portion of said steam condensate to step (a) as at least part of said steam condensate specified.

The invention claimed:
1. Process for the endothermic catalytic conversion of hydrocarbons in a conversion zone which comprises passing hydrocarbons to be converted into said zone under conversion conditions including presence of hereinafter specified steam; removing from said zone a total effluent stream comprising converted hydrocarbons and steam; separating said effluent into a hydrocarbon stream and an aqueous stream contaminated with hydrocarbons; passing said aqueous stream into a treating zone under conditions sufficient to remove therefrom a portion of said contaminants; introducing the treated aqueous stream into a filtration zone under conditions sufficient to substantially remove the remaining contaminants from the stream thereby producing a purified condensate; producing steam from said purified condensate; and, utilizing at least part of said produced steam in said conversion zone.

2. Process according to claim 1 wherein said conversion is the dehydrogenation of alkylaromatic hydrocarbons.

3. Process according to claim 2 wherein said aromatic hydrocarbons comprise ethylbenzene.

4. Process according to claim 1 wherein said filtration zone comprises a fixed bed of adsorbent selective for said contaminant.

5. Process for producing styrene in high concentration via the catalytic dehydrogenation of ethylbenzene which comprises the steps of:
  (a) admixing ethylbenzene and steam condensate and passing said admixture into a conversion zone maintained under conditions sufficient to convert ethylbenzene to styrene;
  (b) removing from said zone a total effluent stream comprising styrene, ethylbenzene, gaseous hydrocarbons, and steam;
  (c) quenching said effluent with an aqueous stream;
  (d) passing the quenched effluent into a separation zone under conditions sufficient to produce a hydrocarbon fraction and an aqueous fraction contaminated with hydrocarbons;
  (e) returning a portion of said aqueous fraction from step (d) to step (e) as at least part of said quench;
  (f) introducing the remainder of said aqueous fraction of step (d) into a stripping zone under conditions sufficient to produce an overhead fraction comprising mainly relatively light hydrocarbons and a bottom fraction comprising mainly dirty water and relatively heavy hydrocarbonaceous products;
  (g) passing said bottoms fraction into a filtration zone under conditions including the presence of a solid adsorbent sufficient to remove dirt and said relatively heavy products from the water thereby producing purified steam condensate; and,
  (h) returning at least a portion of said steam condensate to step (a) as at least part of said steam condensate specified.

6. Process according to claim 5 wherein said overhead fraction of step (f) is returned to the separation zone of step (d).

7. Process according to claim 5 wherein said solid adsorbent of step (g) is selected from the group consisting of activated charcoal, molecular sieves, alumina, spent cracking catalyst, activated clay, sand, and diatomaceous earth.

8. Process according to claim 7 wherein said adsorbent comprises molecular sieves.

References Cited
UNITED STATES PATENTS

| | | | |
|---|---|---|---|
| 3,384,577 | 5/1968 | Shaffer et al. | 208—363 X |
| 3,409,689 | 11/1968 | Ward | 260—669 |

DELBERT E. GANTZ, Primary Examiner

C. R. DAVIS, Assistant Examiner